Aug. 14, 1928.
F. F. RENWICK
PHOTOGRAPHIC FILM
Filed Aug. 20, 1925
1,680,636
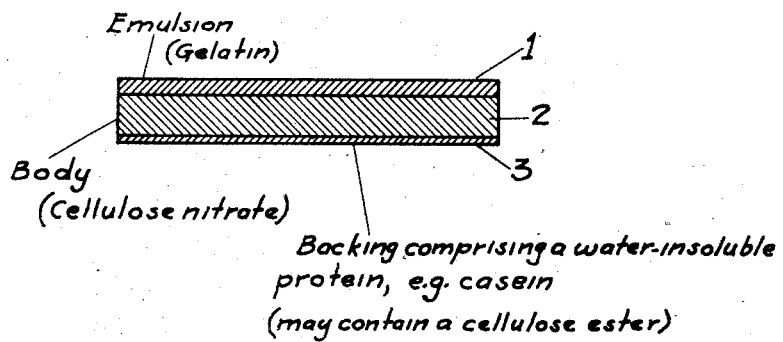
F. F. Renwick Inventor
By his attorney Patented Aug. 14, 1928.

1,680,636

UNITED STATES PATENT OFFICE.

FRANK FORSTER RENWICK, OF PARLIN, NEW JERSEY, ASSIGNOR, BY MESNE ASSIGNMENTS, TO DU PONT-PATHE FILM MANUFACTURING CORPORATION, OF WILMINGTON, DELAWARE, A CORPORATION OF DELAWARE.

PHOTOGRAPHIC FILM.

Application filed August 20, 1925. Serial No. 51,508.

This invention relates to photographic film and particularly to film of the so-called "non-static" type. In the motion picture art, particularly, trouble is experienced with static electrical charges on the film which are, for example, frictionally generated when the film is run rapidly through cinematographic apparatus. These charges, if not counteracted in some way, cause markings on the film and may, indeed, cause fire. The present invention has to do with a film which, by virtue of its construction, overcomes, or rather, eliminates "static" difficulties of the character mentioned. It is the object of the invention to provide a film having the mentioned, and other, desirable characteristics.

Because of its strength, ease of working, availability, and so on, it is desirable that a film should be primarily of cellulose nitrate. A difficulty with this material is, however, that it strongly charges electrically in use, charging negatively. In accordance with the present invention there is used with the desirable nitrocellulose body another pellicle-forming composition which charges positively. This composition is preferably applied as a backing. Furthermore, the backing is such that it is, for practical purposes, insoluble in the baths and resistant against scratching or other damage. Thus the invention provides a film which, although it is primarily of nitrocellulose is non-static and is at the same time not adversely affected by baths and so on.

Without restricting the invention thereto, a film embodying it is shown in the accompanying drawing. In the drawing, which is a conventional, exaggerated, cross-sectional view, the emulsion is indicated at 1, the body at 2, and the backing at 3, the same being constituted as indicated by the applied legends.

In conformity with the above, the backing may comprise cellulose nitrate and a protein which electrifies positively as, for example, casein, gelatin, albumen, keratin, and vegetable proteins such as zein, or may comprise cellulose acetate and proteins. In cases where the substance used with the water-insoluble cellulose ester is water-soluble, the presence of the water-insoluble ingredients prevents, for practical purposes, adverse affecting of the backing by the baths, I have found. In certain cases, notably that of casein, when the anti-static substance is insoluble, the protein may be used alone as a layer or backing. A film body is ordinarily, of course, used to carry a sensitized emulsion. This emulsion comprises gelatin, so that, when carrying the emulsion, the present film comprises a central nitrocellulose negative layer with a positive layer on each side thereof.

The general methods of casting film and applying backings are, of course, well-known and need not be here described in detail; but as illustrating the invention, without however confining it to the examples given, the following formulas are given:—

(1) Casting dope for forming a body to which emulsion, and backings of the present invention, may be applied:—nitrocellulose 16.5; acetone 80; camphor 2; fusel oil 2.5 (parts by weight).

(2) Aqueous casein backing solution:— Soak 30 grams of casein overnight in 100 cc. of water to which has been added 15 cc. of concentrated ammonia solution. Add water to bring the volume up to 1500 cc. Warm to 100° F. and filter through a fine cloth. For use this solution should be diluted with from 5 to 100 times its volume of water. With less than 10 fold dilution it is apt to give smeary backings; with 200 times dilution its effect is not usually sufficiently strong to be useful.

(3) Mixed-solvent casein backing solution:—Soak 30 grams of casein in 15 cc. of concentrated ammonia plus 1725 cc. water. Warm to about 100° F. cool, and add 150 cc. of denatured ethyl alcohol, then add 11625 cc. of methyl alcohol with stirring followed by 1500 cc. of acetone.

(4) Backing solution containing cellulose acetate and gelatin:—Prepare the following "A" and "B" solutions and add "A" to "B" while stirring thoroughly. Solution A:— Acetone-soluble cellulose acetate 5 grams; acetone 225 cc.; benzyl alcohol 20 cc. Solution B:—Dissolve 5 grams of hard photographic gelatin in a solution of 2 gs. of acetic acid in 5 cc. methyl alcohol plus 5 cc. water, with gentle warming, and add this solution to 220 cc. of methyl alcohol.

(5) Backing solution containing nitrocellulose and gelatin:—Dissolve by gentle warming 30 grams of gelatin in a mixture of, acetic acid 12 grams, water 66 grams, denatured ethyl alcohol 60 grams. Add 360 grams of denatured ethyl alcohol. Then add the solution to 4164 grams of denatured ethyl alcohol, and finally add 1680 grams of acetone. Dissolve 12 grams of nitrocellulose in this mixture.

(6) For a backing solution containing casein and cellulose nitrate or acetate, a solution of the cellulose ester in compatible solvents may be mixed with solution "3," the respective amounts being varied as desired having regard for the general consideration, illustrated by formulas "4" and "5," that in those cases where a cellulose ester is used in conjunction with a protein the solvent must be such as will dissolve the ester without precipitating the protein in the concentrations employed.

In addition to the possibilities indicated above, it will be evident that a backing solution may comprise more than one protein, such solution being prepared, say, by mixing suitable solutions of the proteins, as casein and gelatin. Also, of course, more than one protein may be used in conjunction with one or more cellulose esters.

As will be plain to those skilled in the art, all backings are applied in solution form by means of a roller dipping in a trough in one or other of the customary manners, and solvents evaporated. The backing layer is excessively thin, only about 6 pounds of the solution employed being required for 100 square feet of film base. The backing is substantially neutral and has no effect upon the emulsion when the film is rolled.

Regarding the degree of esterification of the cellulose esters employed, the nitrate may contain from 9 to 12.5 per cent nitrogen, and the acetate from 52 to 58 per cent acetyl. As to the gelatin, the purest commercial photographic gelatin is satisfactory. This gelatin, I have found, is more conductive than cellulose nitrate or acetate.

In using the casein, it is desirable to have the backing layer thin to avoid the possibility of cloudiness. Thin layers are, of course, obtained by using dilute solutions. Furthermore, by using nitrocellulose or acetyl cellulose in the same solution with the casein there is provided a further guard against cloudiness.

Should it for any reason be desired, materials for increasing the electrical conductivity of the backing may be employed, such a material being, for instance, a metallic salt, say potassium nitrate, as will be understood.

For the sake of brevity in the claims I, on occasion, employ the terms "positive" and "negative" as indicating that the materials mentioned will develop a positive or negative electrical charge when acted on frictionally. The degree to which the opposite charges counteract each other, and the extent to which film is fully non-static will, of course, depend on various conditions; but, in any case, the combination of positive and negative materials is highly advantageous.

This is a companion case to my United States application Serial No. 51,507, for photographic film, filed August 20, 1925.

I claim:

1. A cinematographic non-static photographic film having a body of cellulose nitrate and a non-scratching substantially smooth backing electrically positive with respect to the body and composed of a water-insoluble protein substantially free from grains and free from pigmentary and other granular materials.

2. A cinematographic non-static photographic film having a body of cellulose nitrate and a non-scratching substantially smooth backing electrically positive with respect to the body and composed of casein substantially free from grains and free from pigmentary and other granular materials.

3. A photographic film including a body layer comprising cellulose nitrate, and a layer comprising a cellulose ester and a water-insoluble protein.

4. A photographic film including a body layer comprising cellulose nitrate, and a layer comprising a cellulose ester and a water-insoluble protein positively electrifiable with respect to cellulose nitrate.

5. A photographic film including a body layer comprising cellulose nitrate, and a layer comprising a cellulose ester and casein.

6. A photographic film including a body layer comprising cellulose nitrate, and a backing layer comprising cellulose nitrate and casein.

In testimony whereof I affix my signature.

FRANK FORSTER RENWICK.